United States Patent [19]
Satoh et al.

[11] Patent Number: 5,942,818
[45] Date of Patent: Aug. 24, 1999

[54] CONTROL APPARATUS FOR ENGINE-DRIVEN PERMANENT MAGNET TYPE SYNCHRONOUS GENERATORS

[75] Inventors: Yoshio Satoh; Takafumi Fukada, both of Kanagawa-ken, Japan

[73] Assignee: Isuzu Ceramics Research Institute Co., Ltd., Kanagawa-ken, Japan

[21] Appl. No.: 09/020,297

[22] Filed: Feb. 6, 1998

[51] Int. Cl.$^6$ .......................... H02K 33/00; H02K 15/00; H02M 5/45; H02M 5/42

[52] U.S. Cl. ................................ 310/46; 363/37; 363/89; 322/28

[58] Field of Search ................................... 323/222, 282; 363/37, 89; 322/28, 46

[56] References Cited

U.S. PATENT DOCUMENTS

| | | | |
|---|---|---|---|
| 5,559,685 | 9/1996 | Lauw et al. | 363/37 |
| 5,793,625 | 8/1998 | Balogh | 323/222 |

FOREIGN PATENT DOCUMENTS

| | | |
|---|---|---|
| 1-285756 | 11/1989 | Japan. |
| 8-237998 | 9/1996 | Japan. |
| 9-056197 | 2/1997 | Japan. |
| 9322600 | 12/1997 | Japan. |

*Primary Examiner*—Nestor Ramirez
*Assistant Examiner*—Peter Medley
*Attorney, Agent, or Firm*—Browdy and Neimark

[57] ABSTRACT

This invention relates to a control apparatus for permanent magnet type generators, having a voltage control unit for controlling a voltage of a permanent magnet type generator driven by an automobile engine, and a power conversion unit for converting the DC source power of an automobile into commercial AC power during the stoppage of the engine. The voltage control unit is capable of reducing the number of large current switching elements, being formed to small dimensions and weight and having economically advantageous effects, and comprises an engine-driven permanent magnet type generator, a voltage step-up and rectifying circuit for increasing the voltage of output power generated by the generator, and a conversion circuit adapted to convert an output from the voltage step-up and rectifying circuit into three-phase AC power by a pulse-width modulation control system, and having a voltage step-down function. The power conversion unit has the generator, a battery and a voltage step-up and step-down circuit, and is formed so as to apply an output from the battery to a neutral point of an armature coil of the generator during the stoppage of the engine.

7 Claims, 6 Drawing Sheets

(a) Rectangular waveforms (b) Pulse-width modulation (c) Sine wave-like waveforms pulse-like modulation

CONTROL APPARATUS FOR ENGINE-DRIVEN PERMANENT MAGNET TYPE SYNCHRONOUS GENERATORS

BACKGROUND OF THE INVENTION

1. FIELD OF THE INVENTION

This invention relates to a control apparatus for engine-driven permanent magnet type synchronous generators, adapted to control a voltage generated by a permanent magnet type synchronous generator driven by an automobile engine, and convert the DC power of a battery into commercial AC power.

2. DESCRIPTION OF THE PRIOR ART

In an AC generator driven by an automobile engine, a generated voltage varies in proportion to the rotational frequency of the engine which varies very widely from 500 rpm to several thousand rpm. Therefore, in order to use this generator as a commercial power source, a constant voltage control unit comprising a voltage step-up means and a voltage step-down means, and an inverter circuit for converting DC power into AC power of a desired frequency are required.

Figure 3:
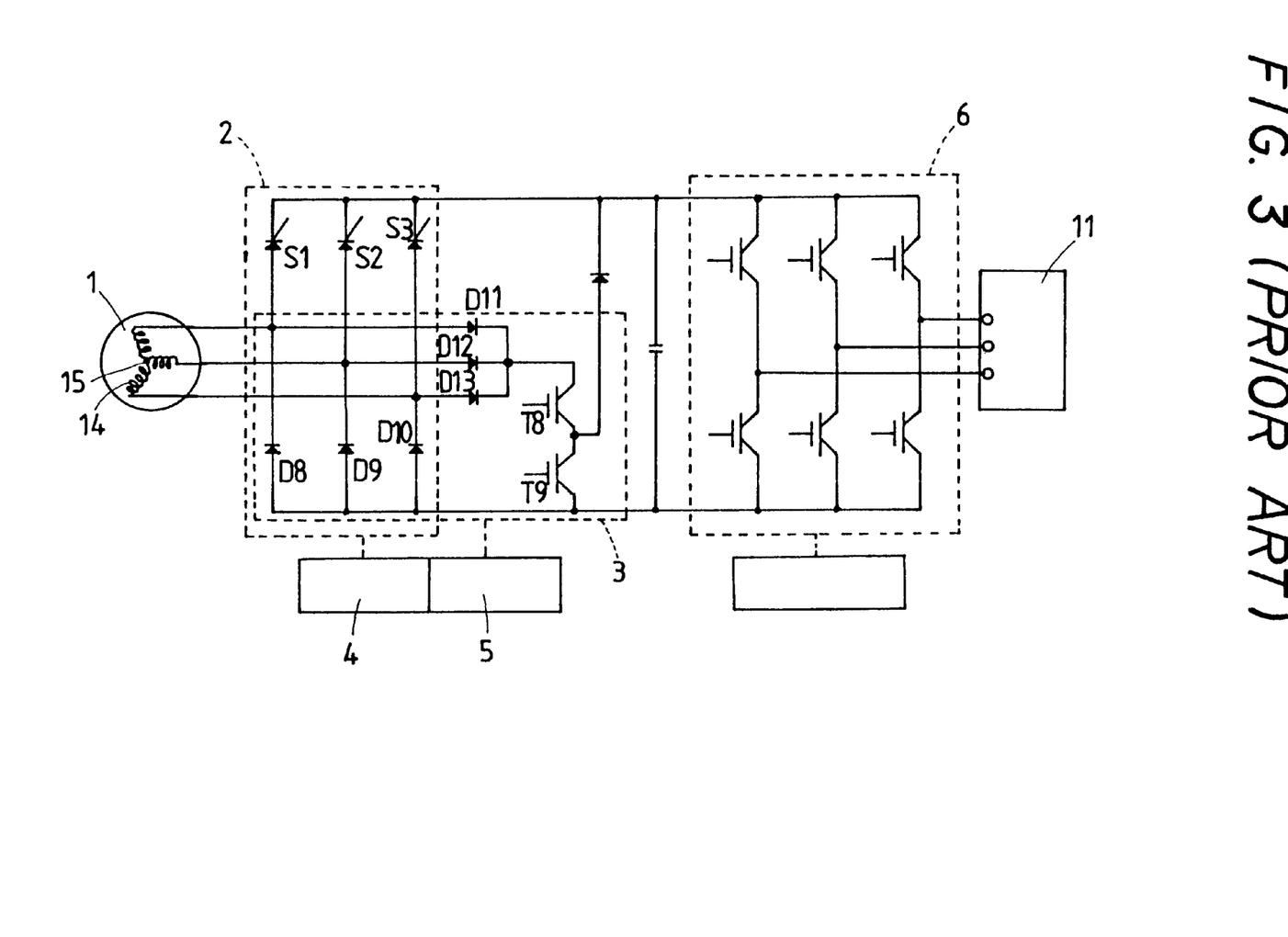
FIG. 3 is a circuit diagram showing a conventional voltage control unit.

An example of a conventional constant voltage control unit is shown in FIG. 3. As shown in FIG. 3, the constant voltage control unit comprises a voltage step-down circuit 2 and a voltage step-up circuit 3. The voltage step-down circuit 2 is adapted to decrease a generated output voltage of a permanent magnet type generator 1, and comprises diodes D8, D9, D10 and thyristors S1, S2, S3, the gates of the thyristors S1, S2, S3 being controlled by a voltage step-down control circuit 4, whereby a voltage step-down control operation is carried out by reducing a conducting angle of a rectifying circuit.

The voltage step-up circuit 3 is adapted to increase a generated output voltage of the permanent magnet type generator 1, and comprises a leakage inductance of an armature coil 14 of the generator 1, diodes D8, D9, D10, D11, D12, D13, and switching transistors T8, T9, a voltage step-up control operation being carried out by controlling the switching transistors T8, T9 by a voltage step-up control circuit 5.

The constant voltage control unit for the generator 1 uses the thyristors S1–S3 and switching transistors T8, T9, and these elements are large current switching elements. Since a control circuit for controlling the large current switching elements are required, the price of the control unit becomes high, and a space necessary for installing these parts increases. During an operation of the voltage step-up control circuit, the diodes D8, D9, D10, D11, D12, D13 form a series circuit to cause a loss occurring in the elements to increase, and an efficiency to decrease. The switching transistor T8 connected in series to the voltage step-up control circuit also constitutes a factor of the increase of the loss, and a switching operation of the switching transistor T9 is unstable in some cases, a special protective circuit being required for the switching transistor T8.

Japanese Patent Laid-Open No. 237998/1996 discloses a voltage control unit for a permanent magnet type three-phase AC generator, which is driven by an automobile engine without using a large current reactor, capable of obtaining a stable generated voltage of the generator at any rotational frequency of the engine.

Figure 7:
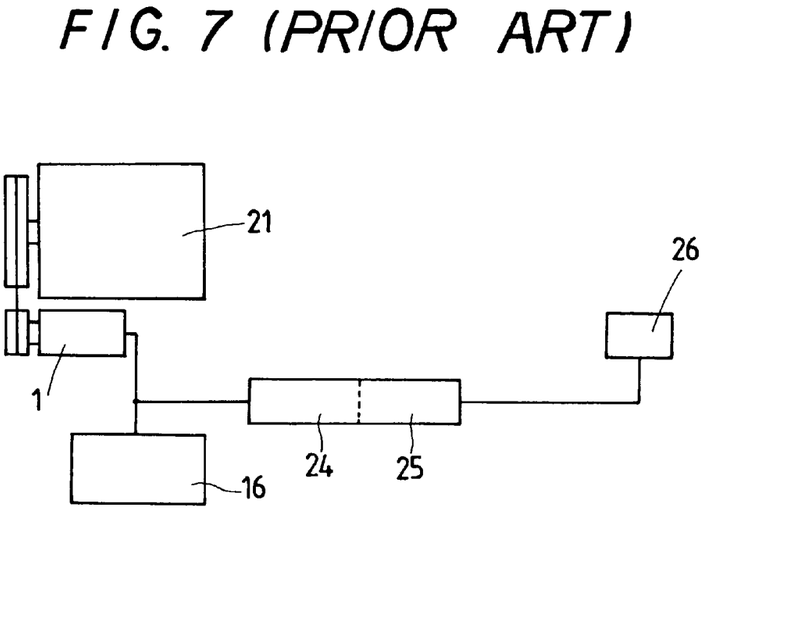
FIG. 7 is a general system diagram of a conventional power converter.

A refrigerator-mounted truck by which materials, such as perishable foods held in a refrigerating or cold insulating container are transported is provided with an electric power converter as shown in FIG. 7, which comprises a reactor or a transformer for converting the DC power (12V or 24V) of the automobile into AC power (100V or 200V), for operating the refrigerator (refer to, for example, Japanese Patent Laid-Open No. 285756/1989).

As shown in FIG. 7, when an engine 21 is operated with the vehicle traveling, a generator 1 is driven by the engine 21 and generates power to charge a battery 16 with the step-up of a voltage of the battery 16 and the conversion of DC power into AC power controlled by a voltage step-up circuit 24 and an inverter circuit 25, whereby commercial AC power is supplied to a load, such as a compressor. When the engine 21 is stopped, the step-up of a voltage of the battery 16 and the conversion of DC power into AC power are controlled by the voltage step-up circuit 24 and inverter circuit 25, and commercial DC power is supplied to the load 26.

Figure 8:
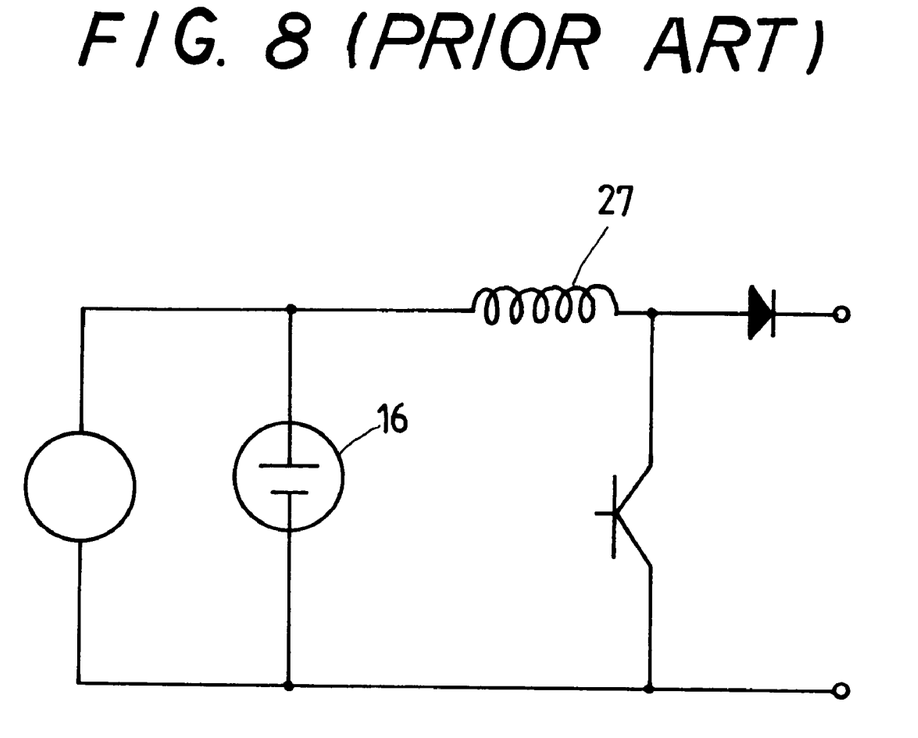
FIG. 8 is a circuit diagram of an inverter for the conventional power converter.

As shown in FIG. 8, the electric power converter referred to above, which usually increases an output from a 12V or 24V generator 1 or a battery 16 to 100V or 200V by a voltage step-up circuit only, so that the voltage step-up circuit needs to comprise a voltage step-up reactor 27. Since the compressor for the refrigerator requires several KW power, the voltage step-up reactor 27 requires a current capacity of around 100 A. Consequently, the electric power converter has to comprise a large and heavy reactor.

SUMMARY OF THE INVENTION

An object of the present invention is to solve these problems, and provide a control apparatus for permanent magnet type generators, capable of obtaining a stable generated voltage of a permanent magnet type generator, which is driven by an automobile engine, at a rotational frequency in any range of the engine, using such a voltage as commercial power source voltage, i.e. AC voltage, and being formed to small dimensions at a low cost.

This invention relates to a control apparatus for permanent magnet type generators, comprising an engine-driven permanent magnet type generator, a voltage step-up and rectifying circuit for increasing a voltage of and rectifying electric power generated by the permanent magnet type generator, a smoothing capacitor parallel-connected to an output side of the voltage step-up and rectifying circuit, and a conversion circuit connected to an output side of the smoothing capacitor, adapted to convert an output from the voltage step-up and rectifying circuit into three-phase AC power by a pulse-width modulation control system and having a voltage step-down function.

This control apparatus for permanent magnet type generators can be provided with an inductance series-connected to an output side of the conversion circuit.

The voltage step-up and rectifying circuit comprises a full-wave rectifier circuit formed of six diodes adapted to rectify a three-phase output from the permanent magnet type generator, switching elements parallel-connected to an output side of the full-wave rectifier circuit, diodes connected to positive output sides of the switching elements, a voltage detecting circuit for detecting a voltage outputted from the diodes, and a voltage step-up control circuit for controlling the switching elements.

The conversion circuit comprises a six-arm type inverter circuit connected to the output side of the smoothing capacitor, and an inverter control circuit for pulse-width modulation controlling the switching elements in the six-arm type inverter circuit.

In this control apparatus for permanent magnet type generators, the engine can be used as an engine to be mounted on an automobile in which the rotational frequency of the engine varies greatly.

This control apparatus for permanent magnet type generators is formed as described above. Since the inverter circuit is formed so as to be pulse-width modulation controlled, it has become possible to provide the inverter circuit with an output voltage step-down function, reduce the number of the voltage step-down circuit elements for an output voltage from a permanent magnet type generator, and form the apparatus to small dimensions and weight and economically advantageously.

In this control apparatus for permanent magnet type generators, stable commercial AC power can be obtained even when the engine is stopped, by applying an output from a DC power source, such as a battery to a neutral point of an armature coil constituting the permanent magnet generator.

Namely, this control apparatus for permanent magnet type generators is provided with a permanent magnet type generator driven by an engine, a battery for accumulating therein the electric power generated by the permanent magnet type generator, and a voltage step-up and step-down circuit adapted to supply the electric power, which is supplied from the permanent magnet type generator, to a load, and convert DC power, which is supplied from the battery, into commercial AC power and supply the AC power to the load, an output from the battery being applied to a neutral point of an armature coil of the permanent magnet type generator, whereby the electric power of the battery can be supplied as AC power.

This control apparatus for permanent magnet type generators has an inductance between the battery and the neutral point of the armature coil of the generator.

When it is necessary that electric power be applied to a load during the stoppage of the engine, in this control apparatus of the above-described structure for permanent magnet type generators, electric power is supplied from the battery to the neutral point of the armature coil of a generator being controlled, to increase the voltage. Therefore, the inductance portion of the armature coil of the generator can also be used as a reactor of the voltage step-up circuit. This enables commercial AC power to be supplied without using an independent reactor in a voltage step-up circuit, the number of parts to be reduced, and a space to be saved.

DESCRIPTION OF THE PREFERRED EMBODIMENTS

The embodiments of the control apparatus for permanent magnet type generators according to the present invention will now be described with reference to the drawings.

A first embodiment of the control apparatus for permanent magnet type generators according to the present invention will now be described with reference to FIG. 1. The control apparatus for permanent magnet type generators of the first embodiment has a voltage control unit, which is adapted to control a voltage of a permanent magnet type generator 1, which is driven by an engine mounted on an automobile, in such a manner that this voltage can be used as commercial source power 11, and enables the number of a large current switching elements T1 to be reduced to one, and the apparatus to be formed to small dimensions and weight and economically advantageously.

Figure 1:
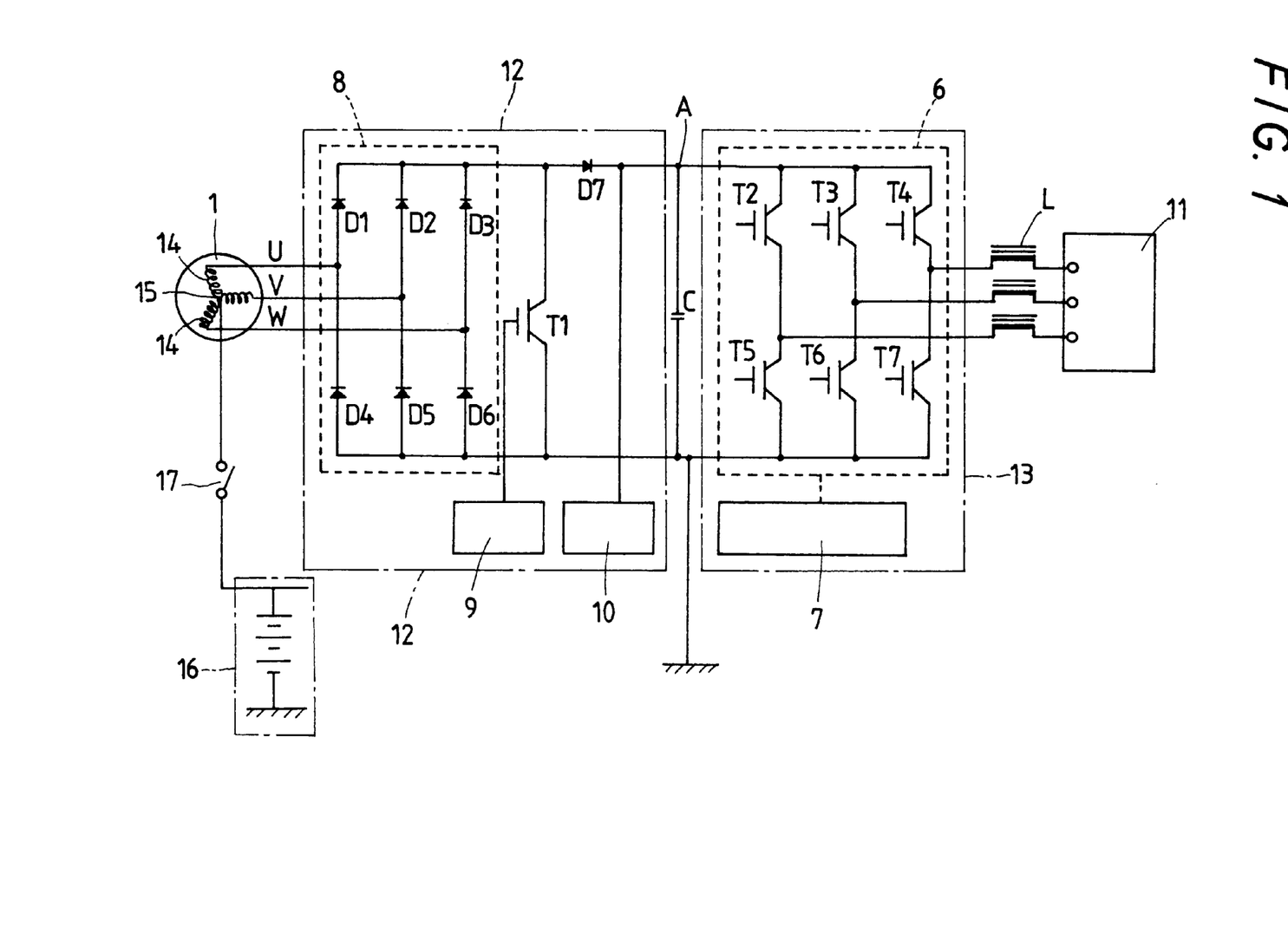
FIG. 1 is a circuit diagram showing a first embodiment of the control apparatus for the voltage control unit-carrying permanent magnet type generator according to the present invention.

As shown in FIG. 1, the voltage control unit in the first embodiment is adapted to control an output from the engine-driven permanent magnet type generator 1, and supply the commercial source power 11, and comprises a voltage step-up and rectifying circuit 12 for increasing the voltage of and rectifying the power generated by the generator 1, a smoothing capacitor C parallel-connected to an output side of the voltage step-up and rectifying circuit 12, a conversion circuit 13 connected to an output side of the capacitor C, adapted to convert an output from the voltage step-up and rectifying circuit 12 into three-phase AC power by a pulse-width modulation control system, and having a voltage step-down function, and an inductance L series-connected to an output side of the conversion circuit 13. In the voltage control unit, providing the inductance L or not providing the same is dependent upon a machine (load 11) connected to an output side thereof, and providing the inductance L is not an absolute condition.

The generator 1 comprises a rotor formed of a permanent magnet, and a stator formed of armature coils 14, i.e. an armature, and is adapted to generate a three-phase output. A DC power source 16, such as a battery is connected to a neutral point 15 of the armature coil 14 through a switch 17.

The voltage step-up and rectifying circuit 12 is adapted to increase a three-phase output of electric power generated by the generator 1 and rectify the resultant output, and comprises a three-phase full-wave rectifier circuit 8 formed of six diodes D1, D2, D3, D4, D5, D6, a power transistor T1 parallel-connected to an output side of the full-wave rectifier circuit 8 and forming a switching element for carrying out a voltage step-up chopping operation, a diode D7 connected to a collector-output side of the power transistor T1, a voltage detecting circuit 10 for detecting a voltage outputted from the diode D7, and a voltage step-up control circuit 9 for controlling the power transistor T1.

The voltage step-up control circuit 9 is adapted to increase a generated voltage of the generator 1 when the generated voltage at the output side (shown by a point A in the circuit) after a DC conversion operation does not reach a target level, the transistor T1 being turned on and off for this purpose.

When the transistor T1 is turned on, an output from the generator 1 is short-circuited, and a short-circuit current flows to the armature coil 14 of the generator 1, so that the energy is accumulated in the leakage inductance of the armature coil 14. When the transistor T1 is then turned off, the accumulated energy is released, so that an output voltage increases. When the voltage at the point A is not lower than the target level, the ON-OFF operations of the transistor T1 is stopped. Thus, an output from the generator 1 is subjected to a voltage step-up operation or kept as it is, and then rectified into a direct current in the three-phase full-wave rectifier circuit 8, the resultant current being sent to the inverter circuit 6 in the conversion circuit 13.

The voltage step-up control circuit 9 functions concretely as follows.

When a voltage between lines U, V of the generator 1 has a positive half cycle in the voltage step-up control circuit 9, a base switching signal of the transistor T1 is transmitted in a rectifier circuit in which a current flows from the diode D1 to the diode D5 through the transistor T1. The transistor T1 receives this signal and is turned on, so that an output from the generator 1 is short-circuited. Consequently, a short-circuit current flows through the armature coil 14 of the generator 1, in which large energy is accumulated since the armature coil 14 has a function of an inductance. When an OFF signal is then transmitted to the transistor T1, it is turned off, and the energy accumulated in the armature coil 14 is sent out through the diode D7. During this time, the energy accumulated in the armature coil 14 turns into a counter-electromotive force, which is added to a regular generated voltage from the generator 1, so that a DC voltage higher than the voltage occurring when a regular generated voltage is rectified is obtained.

When a voltage between the lines U, V of the generator 1 has a negative half cycle in the voltage step-up control circuit 9, a base switching signal of the transistor T1 is sent out similarly in a rectifier circuit in which a current flows from the diode D2 to the diode D4 through the transistor T1. The transistor T1 receives this signal and is turned on, so that an output from the generator 1 is short-circuited. Consequently, a short-circuit current flows in the armature coil 14 of the generator 1, and large energy is accumulated in the armature coil 14 since the armature coil 14 has a function of an inductance. When an OFF signal is outputted to the transistor T1, it is operated in the same manner as mentioned above.

The conversion circuit 13 comprises an inverter circuit 6 formed of transistors T2, T3, T4, T5, T6, T7, and an inverter circuit 7 for carrying out a pulse-width modulation control operation, and is connected to an output side of the smoothing capacitor C. The conversion circuit 13 is adapted to convert an output from the voltage step-up and rectifying circuit 12 into three-phase AC current by a pulse-width modulation control system, and has a voltage step-down function. Namely, the inverter circuit 6 is adapted to convert an output from the voltage step-up and rectifying circuit into a three-phase AC power of a desired frequency. An inductance L is series-connected to an output side of the conversion circuit 13, and an output from the conversion circuit 13 is supplied to a load 11, which consumes commercial source power, through the inductance L. During this time, the inductance L connected to an output portion of the inverter circuit 6 forms an output power smoothing reactor.

The inverter circuit 6 is controlled by the inverter control circuit 7 of a pulse-width modulation system. In the pulse-width modulation control system, a leading edge, a trailing edge or both thereof are changed, whereby a pulse having a width proportional to a momentary value of a modulation signal is formed, by which pulse a voltage step-down control operation is carried out.

Figure 2:
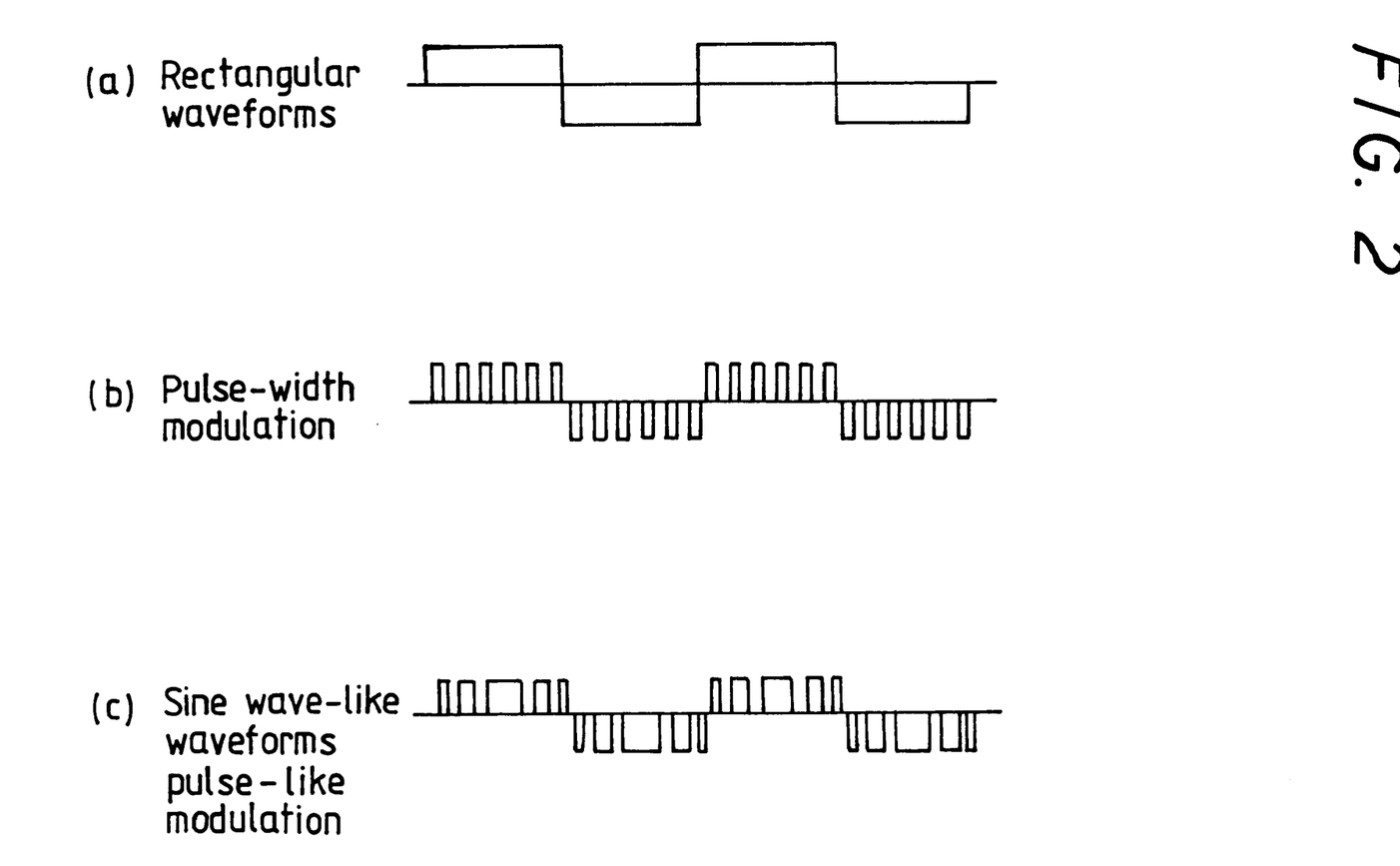
FIG. 2 is an explanatory view showing an output waveform of the first embodiment.

When a voltage at the point A is not lower than a target level, the conversion circuit 13 changes an ON-OFF time ratio of a pulse carrier wave (carrier pulse) as shown in FIG. 2b, and lowers an effective voltage. The ON time and OFF time of the pulse are determined in accordance with a difference between the voltage at the point A and a target voltage so that the three-phase AC voltage becomes constant. In the conversion circuit 13, the pulse-width modulation is not carried out as shown in FIG. 2a when the voltage at the point A is not higher than the target voltage.

In the above-described embodiment, an example of three-phase circuit is shown, and the embodiment can also be formed similarly even when a single-phase inverter is used. In FIGS. 2a and 2b, examples of rectangular waveforms of outputs from the inverter circuit 6 are shown. Even when an output from the inverter has a sine wave-like waveform shown in FIG. 2c, it can be controlled in the same manner.

In the voltage control unit for this control apparatus for permanent magnet type generators, a DC power source 16, such as a battery is connected to the neutral point 15 of the armature coil 14 through a power source driving switch 17. This switch 17 is controlled so that it is connected when the load 11 on commercial source power is turned on during the stoppage of the engine.

When the power source driving switch 17 is turned on, a current from the DC power source 16 is supplied to the voltage step-up control circuit 9 through the armature coil 14 of the generator 1. The voltage of the DC power source 16, such as a battery is 12V–24V, and requires to be increased. Therefore, the transistor T1 forming a switching element is switched at several KHz—several tens of KHz by the voltage step-up control circuit 9. Consequently, the accumulation and discharge of energy occur repeatedly in a leakage inductance portion of the armature coil 14 of the generator 1 to cause a chopper action, whereby the electric power the voltage of which is increased higher than that of the battery is supplied to the capacitor C through the diodes D1, D2, D3, D7. Accordingly, the electric power from the DC power source of a battery can be supplied to the load 11 consuming commercial source power.

Some other embodiments of the control apparatus for permanent magnet type generators according to the present invention will now be described with reference to FIGS. 4, 5 and 6. These embodiments are provided with a power conversion unit, and can use an inductance portion of an armature coil 14 of a generator 1 also as a reactor of a voltage step-up and step-down circuit 28a, 28b, 2bc i.e., a voltage step-up and step-down circuit 28a, 28b, 2bc without requiring an independent reactor of a voltage step-up control circuit can be formed.

First, a second embodiment of the control apparatus for permanent magnet type generators having a power conversion unit will now be described with reference to FIGS. 4 and 5. In the second embodiment of FIGS. 4 and 5, the parts thereof identical with those of the prior art example of FIG. 7 are designated by the same reference numbers.

Figure 4:
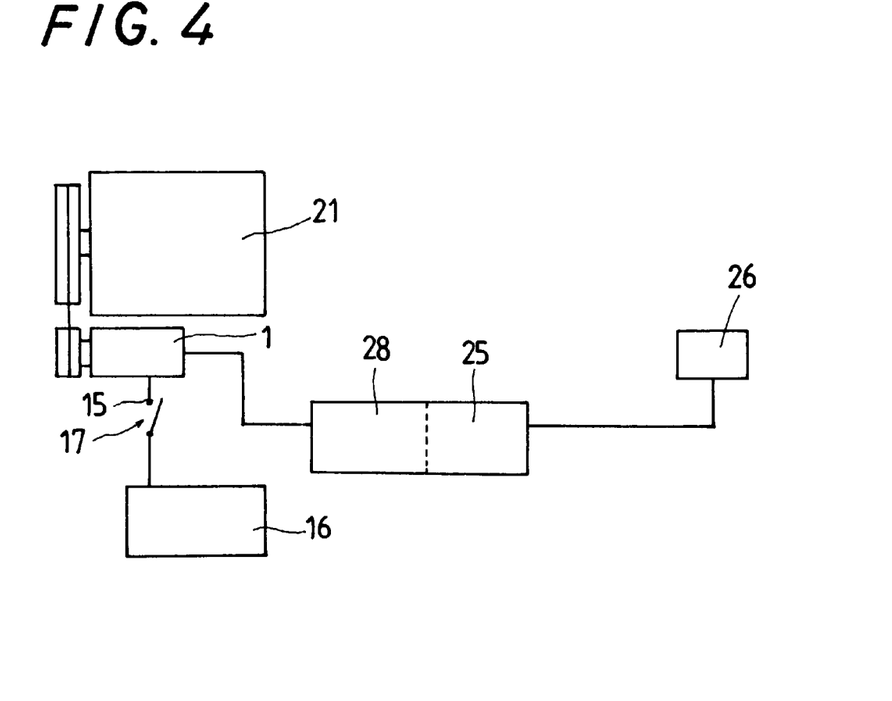
FIG. 4 is a general system diagram showing a second embodiment of the control apparatus for a power converter carrying permanent magnet type generator according to the present invention.

As shown in FIG. 4, an engine 21 is provided with a permanent magnet type generator 1 driven via a belt which transmits a driving power of the engine 21 thereto. An output from the generator 1 is subjected to a voltage step-up or step-down operation suitably in the voltage step-up and step-down circuit 28 and thereby regulated to a constant level, the resultant voltage being applied to an inverter circuit 25. The inverter circuit 25 is adapted to convert the DC power of the voltage step-up and step-down circuit 28 into commercial AC power necessary for the load 26.

A battery 16 is connected to a neutral point 15 of the armature coil 14 of the generator 1 through a driving switch 17 for the battery 16. The driving switch 17 for the battery 16 is controlled so that it is closed when a load 26 using commercial AC power is turned on during the stoppage of the operation of the engine 21.

The operation of the second embodiment of FIG. 4 will now be described with reference to FIG. 5. The generator 1 is a three-phase synchronous generator provided with the star-connected armature coil 14 having the neutral point 15 with a rotor comprising a permanent magnet. Various phases of outputs from the generator 1 are sent out to the voltage step-up control circuit 28.

The voltage step-up and step-down circuit 28 comprises a switching element 28a, a thyristor 28b and a diode 28c for every phase of the generator 1. Although the voltage step-up and step-down circuit 28 does not have a reactor, it utilizes a leakage inductance portion of the armature coil 14 of the generator 1 as a reactor. The controlling of the step-up and step-down of a voltage is done by controlling the switching element 28a and thyristor 28b in a known control circuit.

Namely, when an actual voltage is higher than a target level, the switching element 28a is turned off, and the thyristor 28b is subjected to a phase angle control operation to decrease the voltage. When the actual voltage is lower than a target level, the thyristor 28b is turned on, and the switching element 28a is switched at several KHz—several tens of KHz, whereby the voltage is increased by a leakage inductance portion of the armature coil 14.

In the inverter circuit 25, a best suitable circuit is selected according to the load 26. In the second embodiment, an example in which a three-phase motor consuming three-phase AC power is used as a load is described. The control circuit in this embodiment is the inverter circuit 25 comprising a known three-phase output control circuit 23 as shown in FIG. 5.

The battery 16 is connected to the neutral point 15 of the armature coil 14 of the generator 1 through a positive terminal of the battery and the driving switch 17. As mentioned above when the power source for the load 26 is turned on during the stoppage of the engine 21, the driving switch 17 for the battery 16 is closed. Consequently, an electric current is supplied from the battery 16 to the voltage step-up and step-down circuit 28 through the armature coil 14 of the generator 1. The voltage from the battery 16 is 12V or 24V and requires to be increased, so that the switching element 28a is switched at several KHz—several tens of KHz by turning on the thyristor 28b of the voltage step-up and step-down circuit 28, whereby the voltage is increased by the leakage inductance portion of the armature coil 14 of the generator 1.

A third embodiment of the control apparatus for permanent magnet type generators having a power conversion unit according to the present invention will now be described with reference to FIG. 6.

Figure 5:
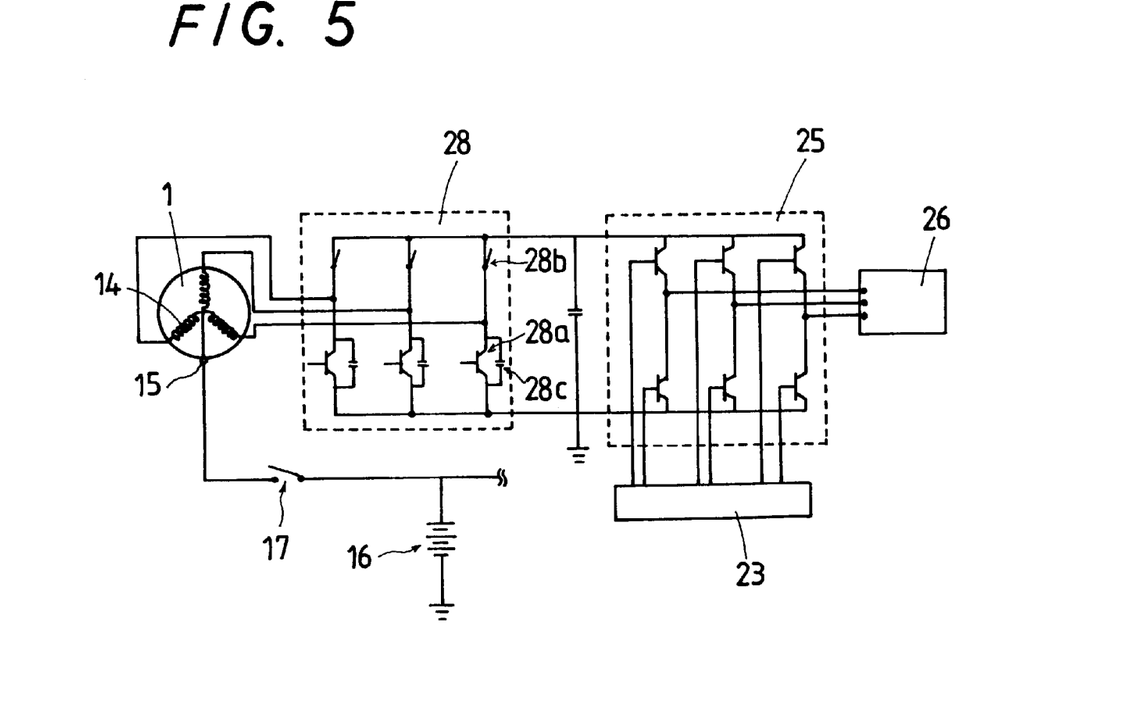
FIG. 5 is a circuit diagram of the second embodiment of FIG. 4.
Figure 6:
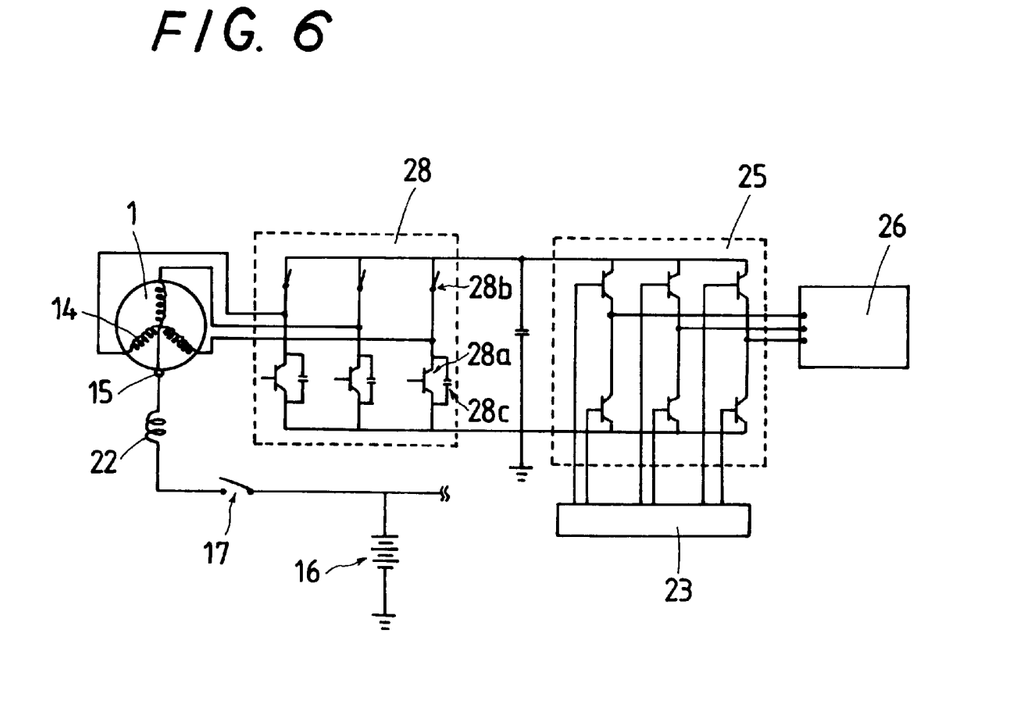
FIG. 6 is a circuit diagram showing a third embodiment of the control apparatus for a power converter-carrying permanent magnet type generator according to the present invention.

In the third embodiment of FIG. 6, the parts thereof identical with those shown in FIG. 5 are designated by the same reference numerals, and the duplication of descriptions is omitted. The third embodiment differs from the second embodiment in that an inductance 22 is inserted between a driving switch 17 for the battery 16 and a neutral point 15 of a generator 1 in the former. The inductance 22 is capable of compensating for a deficiency of a leakage inductance portion of an armature coil 14 of a generator 1 when the leakage inductance portion is small with respect to the electric power which a load 26 requires, with a sufficient increase in the voltage not obtained. Thus, the inductance 22 enables required power to be supplied, and the voltage to be sufficiently increased.

What is claimed is:

1. A control apparatus for permanent magnet type generators, comprising an engine-driven permanent magnet type generator, a voltage step-up and rectifying circuit for increasing a voltage of and rectifying electric power generated by said permanent magnet type generator, a smoothing capacitor parallel-connected to an output side of said voltage step-up and rectifying circuit, and a conversion circuit connected to an output side of said smoothing capacitor, adapted to convert an output from said voltage step-up and rectifying circuit into three-phase AC power by a pulse-width modulation control system and having a voltage step-down function, and an output from a DC power source being applied to a neutral point of an armature coil, which constitutes said permanent magnet type generator, during the stoppage of said engine.

2. A control apparatus for permanent magnet type generators according to claim 1, wherein an inductance is series-connected to an output side of said conversion circuit.

3. A control apparatus for permanent magnet type generators according to claim 1, wherein said voltage step-up and rectifying circuit comprises a full-wave rectifier circuit formed of first diodes adapted to rectify a three-phase output from said permanent magnet type generator, a first switching element parallel-connected to an output side of said full-wave rectifier circuit, one second diode connected to a positive output side of said first switching element, a voltage detecting circuit for detecting a voltage outputted from said second diode, and a voltage step-up control circuit for controlling said first switching element.

4. A control apparatus for permanent magnet type generators according to claim 1, wherein said conversion circuit comprises a six-arm type inverter circuit connected to an output side of said smoothing capacitor, and an inverter control circuit for pulse-width modulation controlling switching elements in said 6-arm type inverter circuit.

5. A control apparatus for permanent magnet type generators according to claim 1, wherein said engine is used as an engine mounted on an automobile the rotational frequency of which varies greatly.

6. A control apparatus for permanent magnet type generators, comprising a permanent magnet type generator driven by an engine, a battery for accumulating therein the electric power generated by said permanent magnet type generator, and a voltage step-up and step-down circuit adapted to supply the electric power, which is supplied from said permanent magnet type generator, to a load, and convert DC power, which is supplied from said battery, into commercial AC power and supply the AC power to said load, an output from said battery being applied to a neutral point of an armature coil of said permanent magnet type generator during the stoppage of said engine.

7. A control apparatus for permanent magnet type generators according to claim 6, wherein an inductance is provided between said battery and said neutral point of said armature coil of said generator.

* * * * *